United States Patent [19]

Ueda et al.

[11] 4,290,629
[45] Sep. 22, 1981

[54] SEAT BELT EMERGENCY LOCKING DEVICE

[75] Inventors: Takeo Ueda, Fujisawa; Shuichi Asano, Kawasaki, both of Japan

[73] Assignee: Nippon Seiko Kabushiki Kaisha, Tokyo, Japan

[21] Appl. No.: 64,383

[22] Filed: Aug. 8, 1979

[30] Foreign Application Priority Data

Aug. 18, 1978 [JP] Japan ................................ 53-101335

[51] Int. Cl.³ ............................................. B60R 21/10
[52] U.S. Cl. .................................... 280/806; 24/230 A
[58] Field of Search ............... 280/801, 802, 803, 804, 280/805, 806, 807, 808; 180/268, 269, 270; 297/468, 473, 474, 476, 477, 478, 479, 480, 486, 483, 484; 242/107.4 A; 24/230 R, 230 A, 230 AK, 230 AL, 775, 270

[56] References Cited

U.S. PATENT DOCUMENTS

| 3,908,928 | 9/1975 | Okada | 297/477 |
| 4,027,900 | 7/1977 | Igeta | 280/804 |
| 4,126,919 | 11/1978 | Lassche | 24/230 A |
| 4,159,848 | 7/1979 | Manz | 280/804 |

Primary Examiner—Joseph F. Peters, Jr.
Assistant Examiner—Randall A. Schrecengost
Attorney, Agent, or Firm—Wyatt, Gerber, Shoup, Scobey & Badie

[57] ABSTRACT

In a seat belt emergency locking device for retaining a seat belt by inserting into a latch portion a tongue portion connected to the seat belt, which device comprises a base tongue having the tongue portion thereof secured to the seat belt and an auxiliary plate, a retaining device actuable by an inertia device sensing an impact or a sudden acceleration or deceleration exerted on a vehicle and an auxiliary engaging tooth provided on the auxiliary plate are primarily engaged with each other, and subsequently a pallet provided in the latch portion and an engaging tooth provided on the base tongue are secondarily engaged with each other. The primary and secondary engagement actions are operatively associated with each other.

6 Claims, 16 Drawing Figures

SEAT BELT EMERGENCY LOCKING DEVICE

BACKGROUND OF THE INVENTION

1. Field of the Invention

This invention relates to a seat belt emergency locking device for automotive vehicle.

2. Description of the Prior Art

The recent tendency toward higher speeds of automotive vehicles has come to require a seat occupant to wear a seat belt. When a great impact such as collision or the like is exerted on the vehicle or when a great acceleration or deceleration is exerted on the vehicle, a great force may act on the belt so that the latch of the free end of the belt may be disengaged to cause the seat occupant to be thrown out.

To avoid such a situation, there has been developed a device which may sense the impact or the acceleration or the deceleration by means of an inertia device and which may lock the latch to prevent it from being disengaged in an emergency. However, making such a design that the latch device is directly retained by the sensing device involves many inconveniences including a complicated construction. If the strength of the retaining device is increased, the weight thereof becomes greater and the sensing device must be larger in size. On the other hand, if the retaining device is made light in weight by being formed of synthetic resin, the strength thereof will be insufficient.

SUMMARY OF THE INVENTION

The present invention eliminates all these disadvantages. According to the present invention, a tongue portion engaging a latch device preferably comprises a base tongue and an auxiliary plate. Each of the base tongue and the auxiliary plate is provided with an engaging tooth. A retaining device actuable by a sensing device comprising an inertia member and the auxiliary engaging tooth provided on the auxiliary plate are primarily engaged with each other, and subsequently the engaging tooth provided on the base tongue and a pallet provided on a latch portion are secondarily engaged with each other, the primary and the secondary engagement being operatively associated with each other. Since the engagement action takes place with the primary engagement and the secondary engagement coupled with each other, the retaining device and the auxiliary plate which effect the primary engagement need not be made so as to withstand a great force but is only required to operate positively and sensitively and so, they may be formed of a light-weight material such as synthetic resin and the sensing device may be small in size.

Further, the tongue portion inserted in the latch portion to retain the seat belt may be formed by a single tongue having the tongue portion thereof secured to the seat belt, instead of being formed by a base tongue secured to the seat belt and an auxiliary plate. The single tongue may be provided with an auxiliary engaging tooth and an engaging tooth, and the retaining device actuable by the inertia device sensing an impact exerted on the axle of the vehicle or a sudden acceleration or deceleration and the auxiliary engaging tooth may be primarily engaged with each other, and subsequently a pallet provided in the latch portion and the engaging tooth may be secondarily engaged with each other, whereby these two engagement actions may be operatively associated with each other to achieve the same object.

The device of the present invention is equally applicable to the active type seat belt system wherein the seat occupant manually mount and dismount a tongue portion secured to the end of the belt each time he gets on and off the vehicle and to the passive type belt system wherein the belt may be automatically mounted and dismounted in response to opening-closing of the door of the vehicle.

The invention will become more fully apparent from the following detailed description thereof taken in conjunction with the accompanying drawings.

DESCRIPTION OF THE PREFERRED EMBODIMENTS

Figure 1:
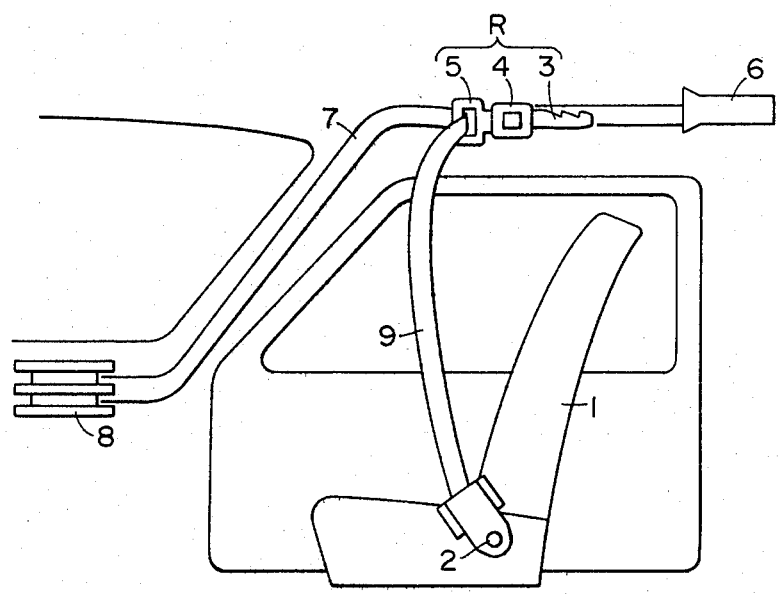
FIG. 1 illustrates a form embodying the present invention.

FIG. 1 illustrates a case where the device of the present invention is applied to a mechanism for effecting mounting and dismounting of a belt in response to opening and closing of the vehicle door. Designated by 1 is a seat, 2 a retractor and 3 a tongue portion which is connected to a seat belt 9 through an emergency releasing buckle 4 and its tongue 5. The tongue portion 3 is inserted in a latch portion 6 mounted on the inner wall of the vehicle. The tongue portion 3, the emergency releasing buckle 4 and the tongue 5 together constitute a runner R which is movable in response to opening and closing of the door by a wire 7 driven by a pulley 8. When the door is closed, the runner R moves rightwardly into the latch portion 6 as viewed in FIG. 1, and the seat belt 9 tightens against the seat occupant. When the door is opened, the runner R moves leftwardly to loosen the belt and permit free egress and ingress of the seat occupant from below the belt.

When the tongue portion does not become disengaged from the latch portion by some reason or other during an accident, the button of the emergency releasing buckle 4 may be depressed to disengage the belt from the buckle 4.

Figure 2:
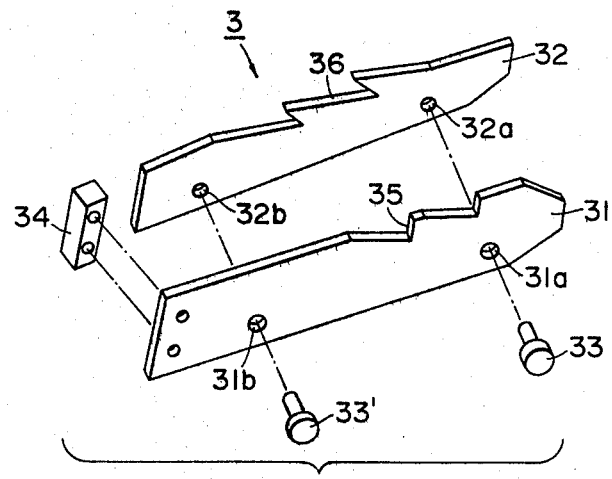
FIG. 2 shows the tongue portion.

FIG. 2 illustrates the construction of the tongue portion. A sturdy base tongue 31 formed of a metal is secured to the emergency releasing buckle 4 at the left of the Figure, and connected to the seat belt 9 through the tongue 5. The base tongue 31 and an auxiliary plate 32 are coupled together by caulking pins 33 and 33' through holes 31a and 31b in the base tongue and holes 32a and 32b in the auxiliary plate.

A wire securing member 34 for attaching the wire 7 is secured to the base tongue 31.

An engaging tooth 35 is provided on one side edge of the base tongue 31, and an auxiliary engaging tooth 36 is provided on the corresponding side edge of the auxiliary plate at a location slightly displaced leftwardly with respect to the engaging tooth 35 (namely, at a location somewhat toward the belt).

Figure 3:
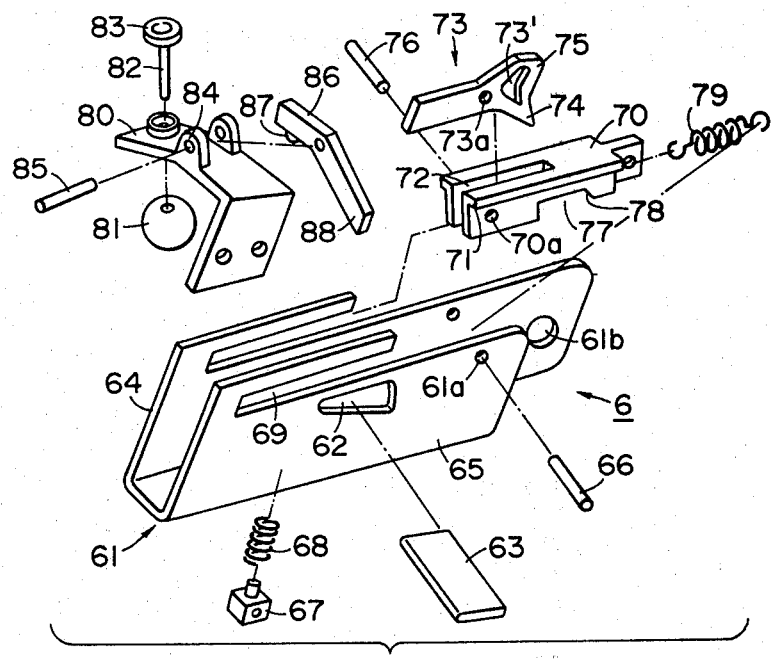
FIG. 3 shows a first embodiment of the latch portion.

FIG. 3 shows a first embodiment of the latch device of the latch portion 6. A housing 61 having an upward opening end is mounted to the inner wall of the vehicle at the base 64 side of the housing by means of a hole 61b therein.

In the upper plate 65 of the housing 61, there is formed a hole 62 having a sector shape and in which a pallet 63 is to be inserted, and the pallet 63 inserted in that hole is normally biased out of engagement with the engaging tooth of the base tongue through a pallet biasing spring 68 attached to a spring support 67 which in turn is mounted on the housing base.

A slit 69 is formed in the upper edge of the housing 61 and the flange 71 of a slider 70 is inserted into the slit to permit the slider to slide against the force of a spring 79. The spring 79 is hooked on a pin 66 passed through a hole 61a in the housing 61. An engaging pivotable rod 73 is pivotably mounted in the slit 72 of the slider. This is accomplished by passing a pin 76 through a hole 70a in the slider and a pin hole 73a in the pivotable rod. The right portion of the pivotable rod is made lighter in weight than the left portion thereof as by forming a cut-away hole 73' rightwardly of the pin hole 73a, and the pivotable rod normally has its right end raised upwardly. A recess 77 is formed in the lower edge of the slider and the pallet 63 may come into the recess and, as will hereinafter be described, a shoulder 78 pressing the pallet 63 exists rightwardly of the recess 77 as viewed in FIG. 3. The right upper end of the pivotable rod provides a head 75 and the right lower end thereof provides a corner tooth 74 which is engageable with the auxiliary engaging tooth 36 of the auxiliary plate 32.

Further, an inertia sensing device is attached to the base 64 of the housing 61. That is, a lever supporting bed 80 is attached to the base 64, and a pendulum 81 is mounted to the supporting bed by passing a pendulum depending rod 82 through a hole in the supporting bed, the rod 82 having a flat head 83. A lever 86 is tiltably mounted on a lever supporting projected portion 84 by means of a pin 85 with the semispherical portion 87 of a lever end resting on the flat head 83 of the pendulum depending rod 82 and with the other end 88 of the lever being in contact with the head 75 of the engaging pivotable rod 73.

Figure 4:
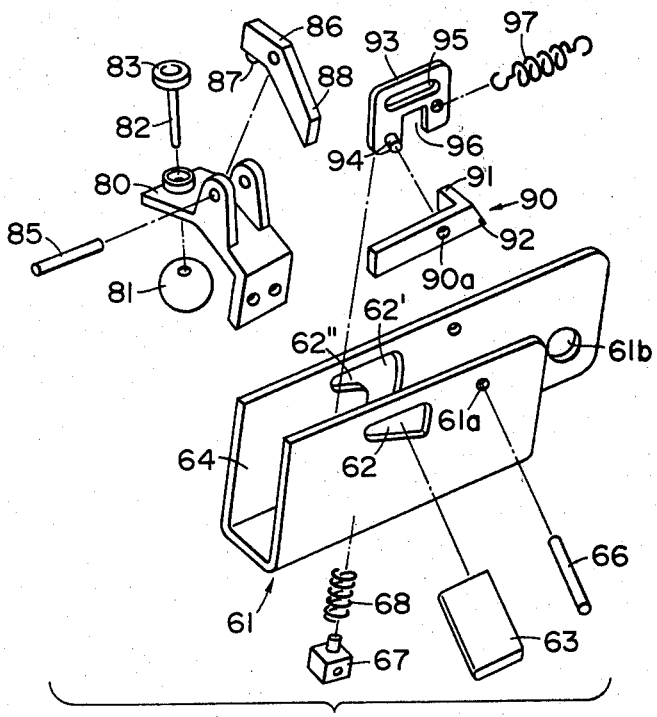
FIG. 4 shows a second embodiment of the latch portion.

FIG. 4 shows another embodiment of the latch device of the latch portion 6. In this embodiment, the housing and the pendulum mechanism are the same as those of the first embodiment, but as a retaining device, a rotatable plate 93 is provided in the housing and the pallet 63 is passed through a slit 95 in the rotatable plate, the pallet 63 being also inserted in a hole 62' in the base 64. The hole 62' is formed with a leftwardly projected portion 62", and the pallet 63 and the rotatable plate 93 are rotatable about such portion 62". By inserting the pin 94 of the rotatable plate into a hole 90a of a pivotable lever 90, the lever 90 is attached to the rotatable plate 93, and the bent portion 91 of the lever extends out through the lower recess 96 of the rotatable plate, and one end 88 of the lever 86 of the inertia sensing device is in contact with the portion of the bent portion 91 which extends out through the recess 96.

The portion of the lever which is rightward of the hole 90a in which the pin 94 is inserted is made lighter in weight so that the right end of the lever is normally raised upwardly.

A spring 97 is attached to the rotatable plate, and this spring is secured to a pin 66 inserted in the hole 61a of the housing. The lower corner 92 of the bend of the pivotable lever 90 provides a corner tooth for engaging the auxiliary engaging tooth 36 of the auxiliary plate 32.

Figure 5:
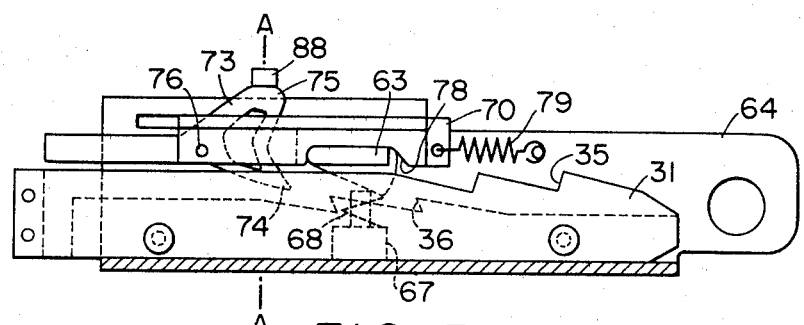
FIGS. 5-10 illustrate the operation of the first embodiment.
Figure 6:
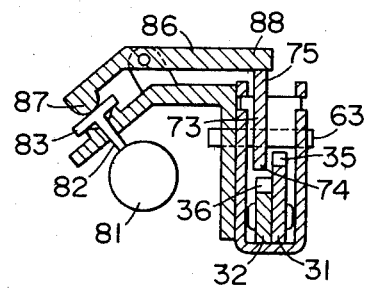
Figure 7:
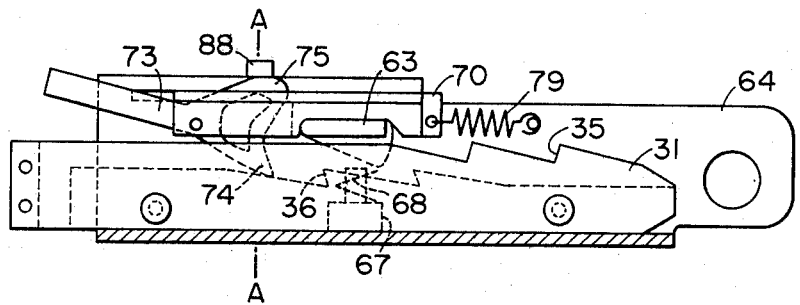
Figure 8:
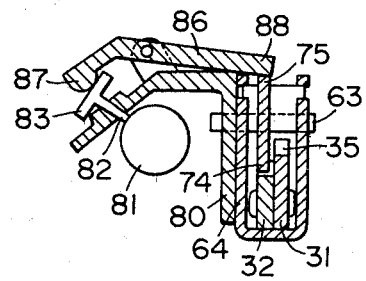
Figure 9:
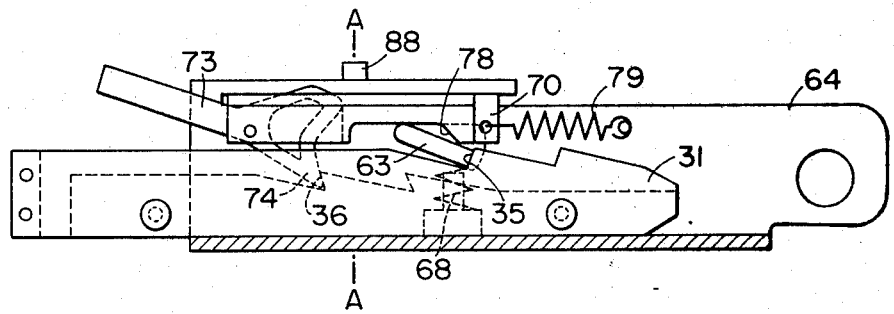
Figure 10:
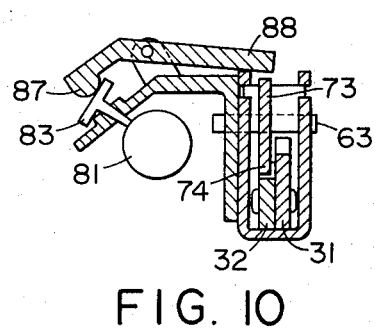

Operation of the present device will now be described. FIGS. 5-10 illustrates the operation of the device shown in FIG. 3. FIGS. 5, 7 and 9 show the manner in which the tongue portion is inserted in the latch portion, and FIGS. 6, 8 and 10 are cross-sectional views taken along line A—A in FIGS. 5, 7 and 9, respectively.

As already described in connection with FIG. 1, when the door is closed, the runner R is rightwardly pulled by the wire 7 driven by the pulley 8 and moved to a position in which the tongue portion 3 is inserted into the latch portion 6, whereby the belt 9 is positioned about the seat occupant.

The present invention is a device for preventing the seat occupant from being thrown out by the belt being intensely pulled and the latch being disengaged upon a great impact or acceleration or deceleration applied to the vehicle due to an accident such as collision or the like.

This device is normally such that as shown in FIGS. 5 and 6, the pendulum 81 depends and the pivotable rod 73 is raised upwardly at its right portion because the right portion is made lighter in weight, and thus it is not engaged with either of the engaging tooth 35 and the auxiliary engaging tooth 36.

When a great impact or acceleration or deceleration due to a collision or the like is exerted on the vehicle, as shown in FIGS. 7 and 8, the pendulum 81 shifts its position and the flat head 83 of the depending rod 82 raises the semispherical portion 87 of the lever 86 so that the other end of the lever is lowered to depress the head 75 of the pivotable rod 73, and thus the pivotable rod 73 pivots clockwise as shown. Subsequently, a force is exerted on the belt by the seat occupant being about to be thrown out and pulls the belt intensely, so that the tongue portion is pulled leftwardly as shown in FIG. 7, but since the right end of the pivotable rod 73 has pivoted downwardly, the corner tooth 74 of the lower end of the pivotable rod comes into engagement with the auxiliary engaging tooth 36, as shown in FIGS. 9 and 10. The tongue portion 3 is continuedly pulled leftwardly, so that the pivotable rod 73 is also pulled leftwardly with the corner tooth 74 remaining engaged with the auxiliary engaging tooth 36. Accordingly, the slider 70 secured to the pivotable rod by a pin 76 is leftwardly pulled with the rod 73 against the force of the spring 79.

Thereupon, the shoulder 78 of the lower side edge of the slider pushes the pallet 63, so that the pallet 63 is clockwisely rotated against the force of the spring 68 and comes into engagement with the engaging tooth 35 of the base tongue 31, thereby preventing the tongue portion 3 from being disengaged from the latch portion 6.

In the device of the present invention, the engagement by the auxiliary engaging tooth of the auxiliary plate is operatively associated with the engagement by the engaging tooth of the base tongue, and a strong force is exerted only on the engaging tooth 35 of the metallic base tongue and the pallet 63 and this permits the auxiliary plate 32 and the pivotable rod 73 to be formed of light-weight synthetic resin or like material and also permits the pendulum of the inertia device to be small in size.

When the impact ceases and the pendulum returns to its normal position, the lever 86 also returns to its horizontal position and the pivotable rod 73 returns to its original position due to gravity. Therefore, if the tongue portion is manually pushed back slightly rightwardly after the impact has ceased, the engagement between the corner tooth 74 and the auxiliary engaging tooth 36 is broken and the slider 70 is also pulled rightwardly by the spring 79 and the pallet 63 is also pushed by the spring 68 and brought out of engagement with the engaging tooth 35, thus enabling the tongue portion 3 to be removed from the latch portion 6 manually, or by opening of the door.

Also, as by previously pressing the wire by means of a spring, the runner can be made to automatically return to the right to disengage the tongue portion from the latch portion when the tension on the seat belt has ended.

Figure 11:
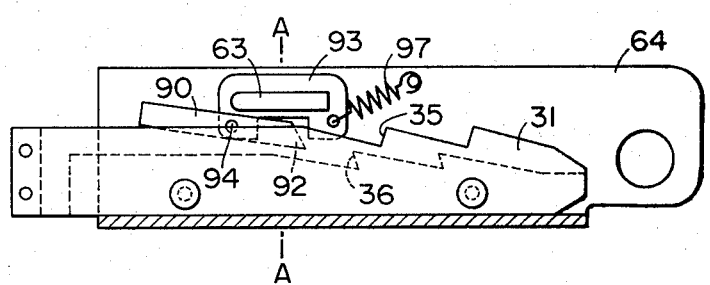
FIGS. 11-16 illustrate the operation of the second embodiment.
Figure 12:
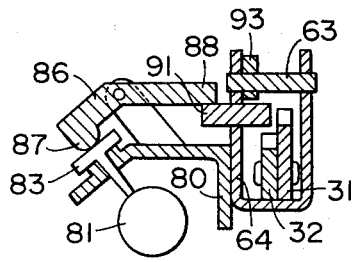
Figure 13:
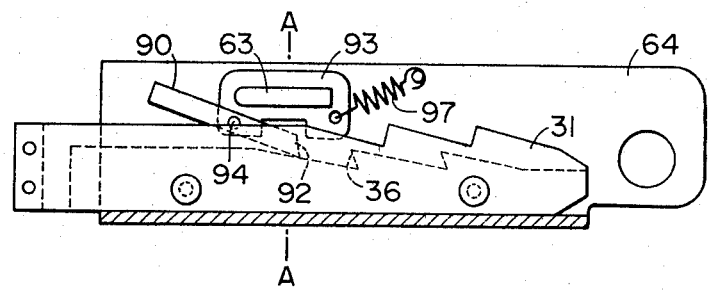
Figure 14:
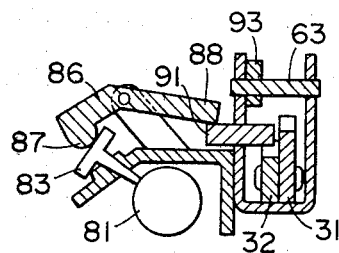
Figure 15:
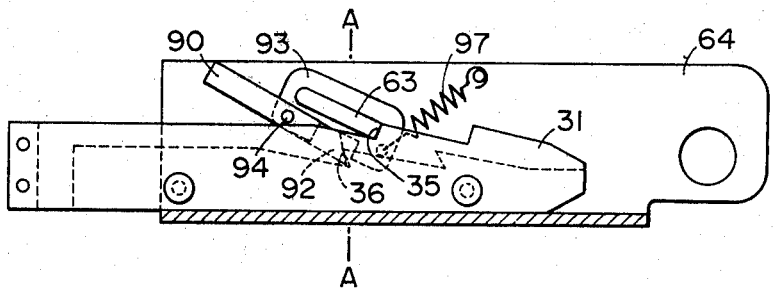
Figure 16:
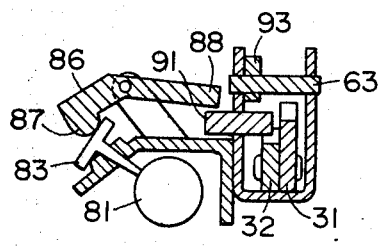

FIGS. 11-16 illustrate the operation of the device shown in FIG. 4. FIGS. 11, 13 and 15 show the manner in which the tongue portion enters the latch portion, and FIGS. 12, 14 and 16 are cross-sectional views taken along line A—A in FIGS. 11, 13 and 15, respectively. As shown in FIG. 11, neither the pivotable lever 90 nor the pallet 63 are normally in engagement with the engaging tooth 35 of the tongue portion and the auxiliary engaging tooth 36. When the inertia sensing device is operated and one end 88 of the lever 86 depresses the bent portion 91 of the pivotable lever 90, the pivotable lever is rotated clockwisely about the pin 94 as shown in FIGS. 13 and 14. Subsequently, the tongue portion 3 is pulled leftwardly, so that the end corner tooth 92 of the pivotable lever 90 primarily engages the auxiliary engaging tooth 36 of the auxiliary plate 32. Subsequently, the tongue 3 continues to be pulled leftwardly, so that, is shown in FIGS. 15 and 16, the pivotable lever 90 and therewith, the rotatable plate 93 due to their interconnection at the pin 94. Since the pallet 63 is fitted in the slit 95 of the rotatable plate 93, the pallet 63 and the rotatable plate 93 are both rotated clockwisely at the projected end 62" of the hole 62' of the base 64 against the force of the spring 97. Therefore, the pallet 63 secondarily engages the engaging tooth 35 of the base tongue, to effect retaining action. In this device, as in the aforementioned first embodiment, if the tongue portion is manually pushed back slightly rightwardly after the impact has ceased, the engagement between the corner tooth 92 and the auxiliary engaging tooth 36 is broken to permit the rotatable plate to be counterclockwisely rotated by the spring 97 and the engagement between the pallet 63 and the engaging tooth 35 is broken, thus enabling the tongue portion 3 to be removed from the latch 6.

Again in this case, as in the first embodiment, as by previously pressing the drive wire by a spring or the like, it is possible to provide that when the tension in the webbing has become exhausted, the runner automatically returns rightwardly and the tongue portion is disengaged from the latch portion.

The foregoing description has been made with respect to an example in which a pendulum is used for the inertia sensing device, but a vertical type weight may be used instead of the pendulum or a steel ball contained in a cavity having an inclined surface may be used.

Also, by attaching a spring or the like to the lever and its supporting bed and selecting the strength of the spring, it is possible to render the inertia sensing device inoperative unless an impact exceeding a certain set force is imparted and to render the emergency locking device inoperative when there is no great shock exerted, such as during stopping the vehicle on a steep slope or during overturn of the vehicle.

With the above-described construction of the present invention, the secondary engagement by the engaging tooth of the base tongue occurs in response to the primary engagement by the auxiliary engaging tooth by the auxiliary plate and this permits the auxiliary retaining member to be formed of light-weight synthetic resin and accordingly permits the inertia sensing device to be small in size. Also, according to the resin molding, a sharp tooth top can be easily obtained and so, there is provided a seat belt emergency locking device which is inexpensive and free of wrong engagement and which is simple in construction and reliable in operation.

What we claim is:

1. In a latching device for a vehicular seat belt for retaining the end portion of the seat belt during a sudden change in the motion of the vehicle, said latching device including a tongue portion held to the end portion of said seat belt, and a latch portion mountable within said vehicle and adapted to receive said tongue portion and retain it in response to a sudden change in the motion of the vehicle, the improvement wherein said tongue portion includes a retaining tooth and an auxiliary tooth spaced from said retaining tooth, said latch portion including inertia-sensitive means engaging said auxiliary tooth upon initially sensing a sudden change in the motion of the vehicle and retaining means thereafter actuated to engage said retaining tooth for securely holding said tongue portion whereby said inertia-sensitive means need not be capable of sustaining the full forces tending to separate said tongue portion from said latch portion.

2. In the improved latching device of claim 1, said tongue portion being formed of a base portion formed of metal and having said retaining tooth formed therein, and an auxiliary portion formed of a synthetic plastics material and having said auxiliary tooth formed therein.

3. In the improved latching device of claim 1 or claim 8, said inertia-sensitive means including a rod adapted to be pivoted into engagement with said auxiliary tooth upon a sudden change of motion of the vehicle, and said retaining means including a slider held to said rod and movable upon movement of said auxiliary tooth to pivot a pallet into engagement with said retaining tooth.

4. In the improved latching device of claim 3, said rod being formed of a synthetic plastics material.

5. In the improved latching device of claim 1 or 2, said inertia-sensitive means including a lever adapted to be pivoted into engagement with said auxiliary tooth upon a sudden change of motion of the vehicle, and said retaining means including a plate held to said lever and rotatable upon movement of said auxiliary tooth to position a pallet into engagement with said retaining tooth.

6. In the improved latching device of claim 5, said lever being formed of a synthetic plastics material.

* * * * *